(12) United States Patent
Endo

(10) Patent No.: US 12,122,224 B2
(45) Date of Patent: Oct. 22, 2024

(54) UTILITY VEHICLE

(71) Applicant: Kubota Corporation, Osaka (JP)

(72) Inventor: Yusuke Endo, Sakai (JP)

(73) Assignee: Kubota Corporation, Osaka (JP)

( * ) Notice: Subject to any disclaimer, the term of this patent is extended or adjusted under 35 U.S.C. 154(b) by 272 days.

(21) Appl. No.: 17/826,998

(22) Filed: May 27, 2022

(65) Prior Publication Data

US 2023/0099990 A1    Mar. 30, 2023

(30) Foreign Application Priority Data

Sep. 27, 2021   (JP) .................................. 2021-156918

(51) Int. Cl.
*B60J 5/04* (2006.01)
*B60R 21/13* (2006.01)

(52) U.S. Cl.
CPC ............ *B60J 5/0487* (2013.01); *B60R 21/13* (2013.01); *B60Y 2200/20* (2013.01)

(58) Field of Classification Search
CPC ........ B60J 5/0487; B60J 5/0493; B60J 10/80; B60J 10/84; B60J 10/86; B60R 13/04; B60R 13/043; B60R 13/06; B60R 21/13; B60R 2201/137; B60Y 2200/20; B60Y 2200/23
USPC ................................. 296/146.9, 152; 49/462
See application file for complete search history.

(56) References Cited

U.S. PATENT DOCUMENTS

| | | | | |
|---|---|---|---|---|
| 4,892,348 A | * | 1/1990 | Nozaki | ..................... B60J 10/30 296/1.08 |
| 9,168,813 B2 | * | 10/2015 | Kasuya | ..................... B60J 10/86 |

FOREIGN PATENT DOCUMENTS

| | | | | |
|---|---|---|---|---|
| CN | 206528303 U | * | 9/2017 | |
| DE | 202010005848 U1 | * | 9/2010 | ............. B60R 13/06 |
| JP | 2002240565 A | * | 8/2002 | ............. B60J 10/16 |
| JP | 200880962 A | | 4/2008 | |
| JP | 2018177058 A | | 11/2018 | |

OTHER PUBLICATIONS

CN206528303 Text (Year: 2017).*
DE202010005848 Text (Year: 2010).*
JP2002-240565 Text (Year: 2002).*

* cited by examiner

*Primary Examiner* — Dennis H Pedder
(74) *Attorney, Agent, or Firm* — The Webb Law Firm

(57) ABSTRACT

A utility vehicle includes: a vehicle body; an occupant section disposed in the vehicle body and configured to accommodate an occupant; a door that is disposed at a portion of the vehicle body which portion is lateral to the occupant section and which is openable and closable; a trim that is attached to at least a portion of a first one of an edge portion of the door or a portion of the vehicle body which portion corresponds to the edge portion of the door, and that is configured to be in contact with a second one of the edge portion or the corresponding portion of the vehicle body when the door is in a closed state; and a cover covering the trim.

4 Claims, 2 Drawing Sheets

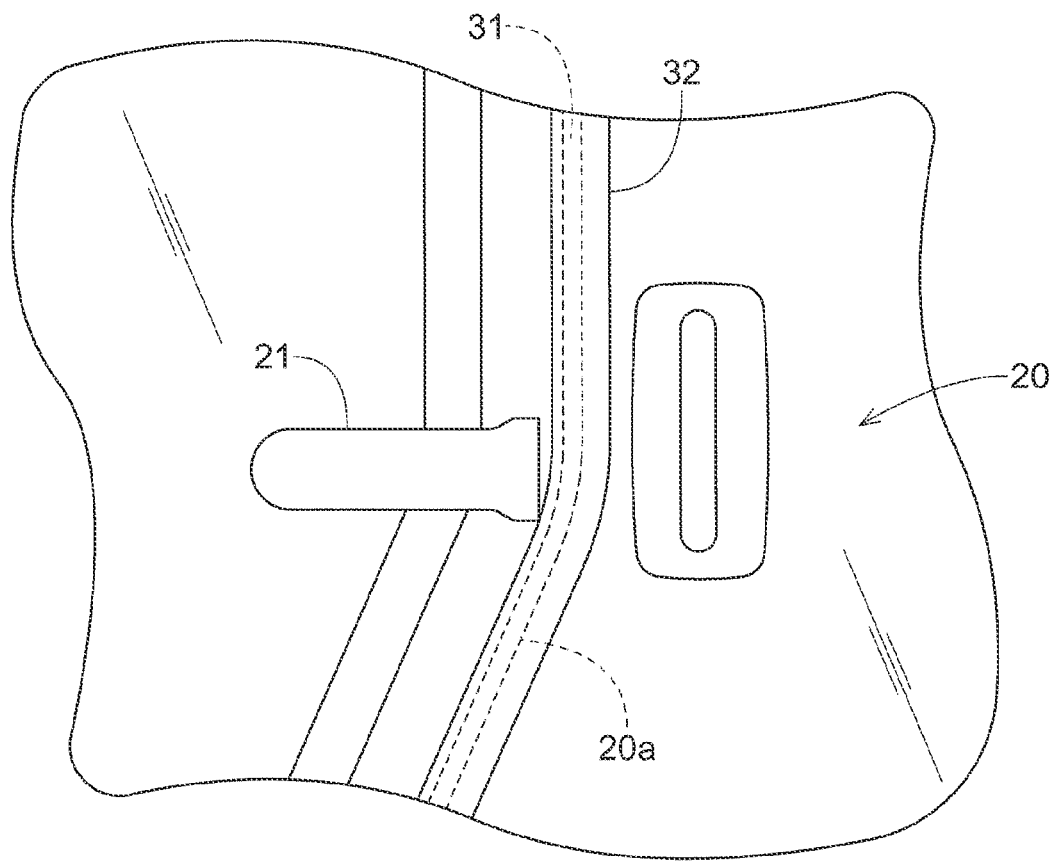
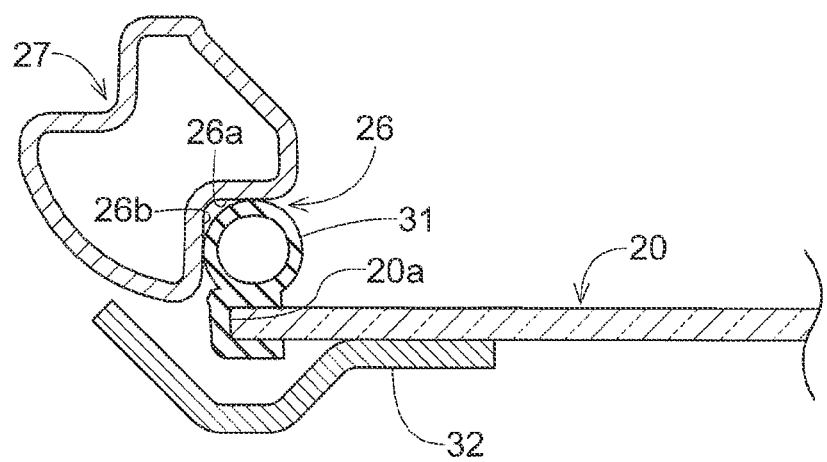

UTILITY VEHICLE

CROSS REFERENCE TO RELATED APPLICATION

This application claims priority to Japanese Patent Application No. 2021-156918 filed Sep. 27, 2021, the disclosure of which is hereby incorporated by reference in its entirety.

BACKGROUND OF THE INVENTION

Field of the Invention

The present invention relates to a utility vehicle that includes: an occupant section in which an occupant is to be situated; and a door that is disposed at a lateral side portion of the occupant section and that is openable and closable.

Description of Related Art

Patent Literature 1 (Japanese Unexamined Patent Application Publication, Tokukai, No. 2018/177058) discloses a utility vehicle that includes an openable-closable door disposed at a lateral side portion of an occupant section of the utility vehicle. Some of such utility vehicles include a trim disposed at an edge portion of the door to close a gap between the door in closed state and the vehicle body.

SUMMARY OF THE INVENTION

In typical cleaning operations of cleaning utility vehicles, high-pressure water discharge is used. When the conventional utility vehicle is cleaned, however, discharged high-pressure water may hit and damage the trim. Also, while the conventional utility vehicle is travelling, the trim may be damaged by contact with pebbles, tree branches, and/or like matter.

In view of the above-described circumstances, an object of the present invention is to provide a utility vehicle capable of preventing its trim from being damaged due to contact with pebbles, tree branches, and/or like matter while the utility vehicle is undergoing a cleaning operation by discharging high-pressure water to the utility vehicle or while the utility vehicle is traveling.

A utility vehicle according to the present invention includes: a vehicle body; an occupant section disposed in the vehicle body and configured to accommodate an occupant; a door that is disposed at a portion of the vehicle body which portion is lateral to the occupant section and that is openable and closable; a trim that is attached to at least a portion of a first one of: an edge portion of the door; or a portion of the vehicle body which portion corresponds to the edge portion of the door and that is configured to be in contact with a second one of the edge portion of the door or the corresponding portion of the vehicle body when the door is in a closed state; and a cover covering the trim.

According to this feature configuration, even if the vehicle undergoes a cleaning operation by discharging high-pressure water to the vehicle, the cover prevents the high-pressure water discharge from hitting the trim. The cover also prevents pebbles and/or like matter from coming into contact with the trim while the vehicle is traveling. Thus, the trim is protected from damage caused by contact with pebbles and/or like matter during cleaning work using high-pressure water discharge or while the utility vehicle is traveling.

In the present invention, it is preferable that the cover covers the trim in a side view of the utility vehicle.

Generally, when a vehicle is cleaned by discharging high-pressure water to a lateral side surface of the vehicle, high-pressure water is discharged from a laterally outer side of the vehicle body toward the vehicle. Also, a side wall portion of the vehicle body and the door are aligned in the front-rear direction of the vehicle body, and there is a gap between the vehicle body and the door in many cases in the left-right direction of the vehicle body. If pebbles and/or like matter fly toward the trim from a lateral outer side of the vehicle body, the pebbles and/or like matter come into contact with the trim. In view of these situations, in the above-described feature configuration, the trim and the cover each other in a side view of the vehicle. This ensures that without increasing the size of the cover, the trim is protected from water discharged from a lateral outer side of the vehicle body and from flying objects such as pebbles.

In the present invention, it is preferable that the cover is provided for the door.

According to this feature configuration, a large opening for boarding is secured when the door is in an open state as compared with a case where the cover is attached to the vehicle body.

In the present invention, it is preferable that the cover is integral with the door.

According to this feature configuration, it is not necessary to perform a step of attaching the cover at the time of vehicle assembly work. Also, if the cover and the door are separate bodies, there is generated a joint or a seam between the cover and the door. The above-described feature configuration, however, prevents generation of a joint or a seam, resulting in improved design properties.

In the present invention, it is preferable that: the vehicle body includes a ROPS frame disposed around the occupant section, at least a portion of the ROPS frame extending along the edge portion of the door; the ROPS frame includes a depression that is disposed in at least a portion of the ROPS frame which portion faces the edge portion of the door, that is depressed toward inside the ROPS frame, and that extends in a direction in which the ROPS frame extends; the trim is attached to at least a portion of one of the edge portion of the door or the depression; and the cover is disposed across the edge portion of the door and a first edge portion of the depression, the first edge portion being opposite to a second edge portion of the depression with respect to the trim, the second edge portion being located at a side at which the edge portion of the door is located.

According to this configuration, the trim is disposed in the depression or the trim is configured to come into contact with the depression. This ensures that the main body of the vehicle body need not be provided with a dedicated member for providing the trim or a dedicated configuration with which the trim comes into contact. Further, the cover is disposed across the edge portion of the door and a first edge portion of the depression, the first edge portion being opposite to a second edge portion of the depression with respect to the trim, the second edge portion being located at a side at which the edge portion of the door is located. This prevents pebbles and/or like matter from entering the depression. As a result, the trim is protected from damage caused by pebbles and/or like matter that have entered the depression.

BRIEF DESCRIPTION OF THE DRAWINGS

FIG. 2 is a plan view of configurations of a door and a cover.
FIG. 3 is a cross-sectional view of configurations of the door, a ROPS frame, and the cover.

DESCRIPTION OF THE INVENTION

Figure 1:
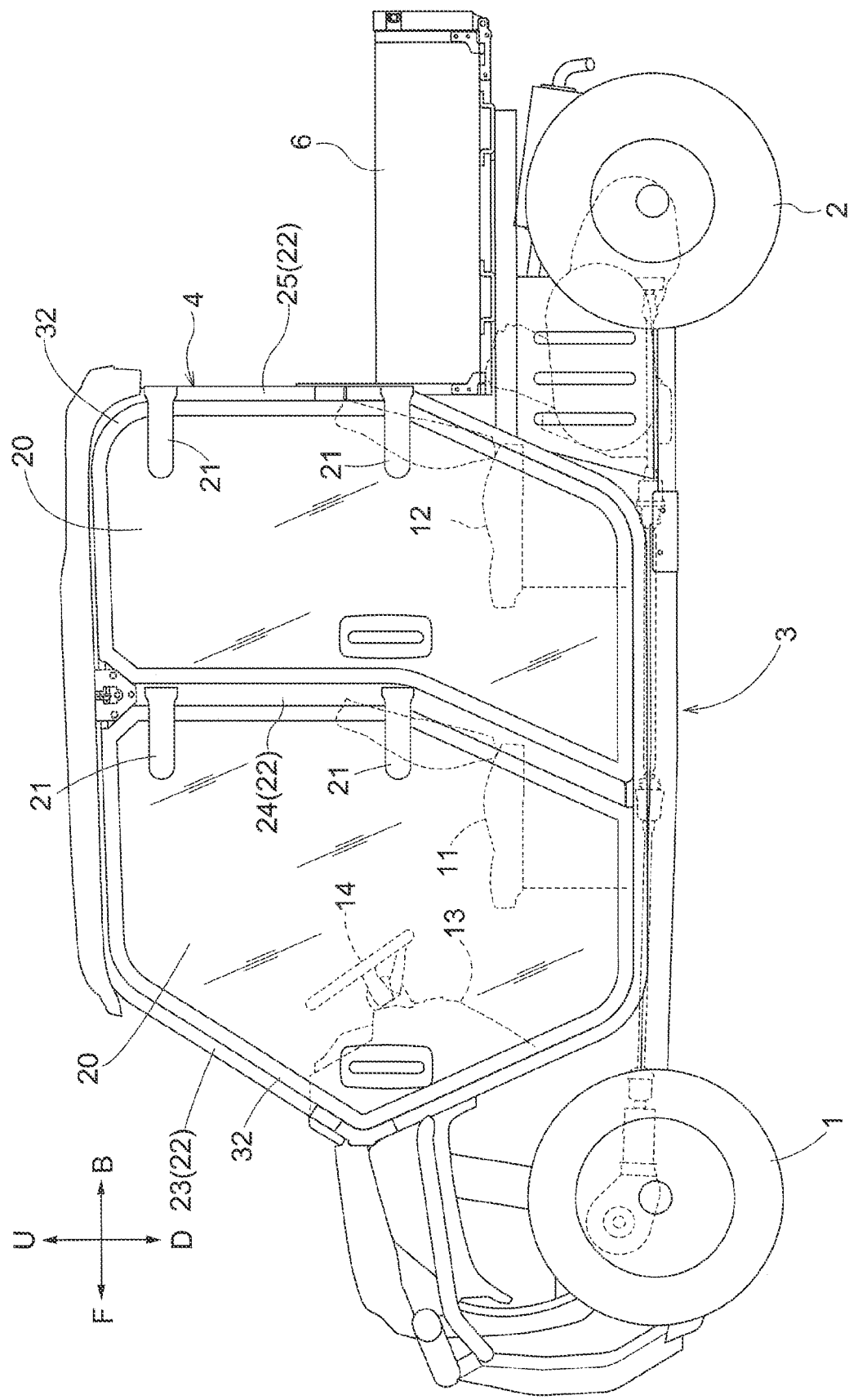
FIG. 1 is a side view of a utility vehicle.

In the embodiments of the present invention, "front-rear direction" and "up-down direction" are described as follows unless otherwise specified. The direction of an arrow F will be referred to as "front" (see FIG. 1), the direction of an arrow B will be referred to as "rear" (see FIG. 1), the direction of an arrow U will be referred to as "upper" (see FIG. 1), and the direction of an arrow D will be referred to as "lower" (see FIG. 1).

When the utility vehicle takes a forward-facing posture in the front-rear direction, the direction corresponding to the right side with respect to the forward-facing posture is "right", and the direction corresponding to the left side with respect to the forward-facing posture is "left".

[Overall Configuration]

FIG. 1 illustrates a utility vehicle. The utility vehicle includes a vehicle body having a body frame 3. The body frame 3 supports right and left front wheels 1 at a front portion of the body frame 3, and supports right and left rear wheels 2 at a rear portion of the body frame 3. The vehicle body includes an occupant section 4, in which an occupant is to be situated. The occupant section 4 is disposed between the front wheels 1 and the rear wheels 2. A cargo bed 6 is disposed behind the occupant section 4.

[Configuration of Occupant Section]

As illustrated in FIG. 1, a front seat 11 is disposed at a front position in the occupant section 4, and a rear seat 12 is disposed at a rear position in the occupant section 4. A steering handle 14, which is for steering the front wheels 1, is disposed at an operation panel 13, which is disposed in front of the front seat 11.

Front and rear doors 20, which are openable-closable doors, are disposed at a lateral side portion of the occupant section 4. The front door 20 is disposed at a lateral side portion of the front seat 11 in the left-right direction of the vehicle body, and the rear door 20 is disposed at a lateral side portion of the rear seat 12 in the left-right direction of the vehicle body.

[Configuration of Roll-Over Protection Structure (ROPS) Frame]

A ROPS frame 22 is disposed around the occupant section 4. The ROPS frame 22 is connected to the body frame 3 and surrounds the front seat 11 and the rear seat 12.

The ROPS frame 22 includes: right and left front support columns 23, which are disposed at front portions of the occupant section 4; right and left middle support columns 24, which are disposed at rear portions of the front seat 11 of the occupant section 4; and right and left rear support columns 25, which are disposed at rear portions of the occupant section 4.

One front support column 23 is formed along a front portion, an upper portion, and a lower portion of an edge portion 20a of the front door 20. One middle support column 24 is formed along a rear portion of the edge portion 20a of the front door 20. That is, the front support column 23 and the middle support column 24 define a front boarding gate, and the front door 20 is capable of opening and closing the front boarding gate.

One middle support column 24 is formed along a front portion of an edge portion 20a of the rear door 20, and one rear support column 25 is formed along an upper portion, a lower portion, and a rear portion of the edge portion 20a of the rear door 20. That is, the middle support column 24 and the rear support column 25 define a rear boarding gate, and the rear door 20 is capable of opening and closing the rear boarding gate.

As illustrated in FIGS. 2 and 3, the ROPS frame 22 has a first depression 26 (corresponding to the "depression"). The first depression 26 is depressed toward the inside of the ROPS frame 22 and has a length along the extension direction in which the ROPS frame 22 extends. The first depression 26 has a first surface 26a and a second surface 26b. The first surface 26a faces the edge portion 20a of the door 20 when the door 20 is closed. The second surface 26b is orthogonal to the first surface 26b. The ROPS frame 22 also has a second depression 27. The second depression 27 is disposed at a side opposite to the first depression 26 in the radial direction of the ROPS frame 22. The second depression 27 has substantially the same shape as the first depression 26.

[Configuration of Door]

The front door 20 is disposed at a lateral side of the front seat 11 in the left-right direction of the vehicle body, and the rear door 20 is disposed at a lateral side of the rear seat 12 in the left-right direction of the vehicle body. As illustrated in FIGS. 1 and 2, each door 20 is supported by a hinge 21, which is connected to the rear portion of the door 20, in such a manner that the door 20 is pivotable open and closed on the rear portion of the door 20 serving as a fulcrum. The hinge 21 of the front door 20, which is disposed at a laterally outer side of the front seat 11 in the left-right direction of the vehicle body, is openably and closably supported by the middle support column 24. The hinge 21 of the rear door 20, which is disposed at a laterally outer side of the rear seat 12 in the left-right direction of the vehicle body, is openably and closably supported by the rear support column 25.

As illustrated in FIGS. 2 and 3, a trim 31 is attached to the edge portion 20a of each door 20. The trim 31 is made of rubber or like material, and has flexibility. The trim 31 is attached to an outer end portion of the edge portion 20a of the door 20. When the door 20 is closed, the trim 31 mainly comes into contact with the first surface 26a of the first depression 26. The contact between the trim 31 and the first surface 26a prevents rainwater or like matter from entering the occupant section 4 from between the door 20 and the ROPS frame 22.

A cover 32 is attached to the edge portion 20a of the door 20. The cover 32 extends along the entire circumferential length of the edge portion 20a of the door 20, and protrudes outward from the edge portion 20a of the door 20.

The cover 32 is disposed across the edge portion 20a of the door 20 and an edge portion of the second surface 26b. This edge portion of the second surface 26b is a first edge portion of the first depression 26. The first edge portion of the first depression 26 is opposite to a second edge portion of the first depression 26 with respect to the trim 31. The second edge portion of the first depression 26 is located in a side area in which the edge portion 20a of the door 20 is located. In this configuration, the cover 32 covers the trim 31 in a side view of the utility vehicle, enabling the cover 32 to protect the trim 31 from water and/or flying objects such as pebbles from a laterally outer side of the vehicle body.

Other Embodiments

Description will be made with regard to embodiments in which the above-described embodiment is modified. A combination of the following other embodiments may be applied to the above-described embodiment insofar as no contradiction occurs. It is to be noted that the scope of the present invention will not be limited to the following other embodiments.

(1) In the above-described embodiment, the trim 31 is attached to the door 20. This configuration, however, is not intended in a limiting sense. For example, the trim 31 may be attached to the vehicle body, that is, to the first depression 26 of the ROPS frame 22, which first depression 26 corresponds to the edge portion 20a of the door 20. Another possible example is that the trim 31 is attached to both the door 20 and the first depression 26 of the ROPS frame 22.

(2) In the above-described embodiment, the cover 32 is attached to the door 20. This configuration, however, is not intended in a limiting sense. For example, the trim 31 may be attached to the vehicle body, that is, to the ROPS frame 22.

(3) In the above-described embodiment, the cover 32 is a body separate from the door 20. This configuration, however, is not intended in a limiting sense. For example, the door 20 may be integral with the cover 32.

(4) In the above-described embodiment, the ROPS frame 22 extends along the edge portion 20a throughout the circumferential length of the door 20. This configuration, however, is not intended in a limiting sense. For example, the ROPS frame 22 may extend along a portion of the edge portion 20a of the door 20.

(5) In the above-described embodiment, the cover 32 extends along the edge portion 20a throughout the circumferential length of the door 20. This configuration, however, is not intended in a limiting sense. For example, the cover 32 may extend along a portion of the edge portion 20a of the door 20.

INDUSTRIAL APPLICABILITY

The present invention is applicable to utility vehicles used for personnel transportation, luggage transportation, recreation, and other purposes.

REFERENCE SIGNS LIST

4: Occupant section
20: Door
20a: Edge portion
22: ROPS frame
26: Depression
31: Trim
32: Cover

The invention claimed is:
1. A utility vehicle comprising:
a vehicle body;
an occupant section disposed in the vehicle body;
a door disposed at a portion of the vehicle body, which portion is lateral to the occupant section, wherein the door is openable and closable;
a trim attached to an edge portion of the door; and wherein the trim is configured to be in contact with a portion of the vehicle body when the door is in a closed state, the portion of the vehicle body corresponding to the edge portion of the door; and
a cover covering the trim;
wherein, the vehicle body comprises a Roll-Over Protection Structure (ROPS) frame disposed around the occupant section, at least a portion of the ROPS frame extending along the edge portion of the door,
the ROPS frame comprises a depression that is disposed in at least a portion of the ROPS frame which portion faces the edge portion of the door, wherein the depression is depressed toward inside the ROPS frame, and extends in a direction in which the ROPS frame extends,
the trim is attached to at least a portion of one of the edge portion of the door or the depression, and
the cover is disposed across the edge portion of the door and a first edge portion of the depression, the first edge portion is opposite to a second edge portion of the depression with respect to the trim, and the second edge portion is located in a side area in which the edge portion of the door is located.

2. The utility vehicle according to claim 1, wherein the cover covers the trim in a side view of the utility vehicle.

3. The utility vehicle according to claim 1, wherein the cover is provided for the door.

4. The utility vehicle according to claim 1, wherein the cover is integral with the door.

* * * * *